United States Patent [19]

Gold et al.

[11] 4,213,319
[45] Jul. 22, 1980

[54] THICKNESS GAUGE

[75] Inventors: Vance B. Gold, Lombard; Robert P. Vandlik, Mount Prospect, both of Ill.

[73] Assignee: American Can Company, Greenwich, Conn.

[21] Appl. No.: 948,714

[22] Filed: Oct. 5, 1978

[51] Int. Cl.² ............... B21C 51/00; B21D 28/00
[52] U.S. Cl. ................................. 72/34; 72/329; 113/116 V; 33/143 L
[58] Field of Search ............ 72/16, 17, 329, 335, 72/441, 34; 113/1 G, 7 R, 7 A, 116 V, 116 Y; 33/143 L, 169 F, 201; 83/66, 67

[56] References Cited

U.S. PATENT DOCUMENTS

| | | | |
|---|---|---|---|
| 3,251,208 | 5/1966 | Mittermaier | 72/16 |
| 3,483,626 | 12/1969 | Huttel | 33/143 L |
| 3,750,294 | 8/1973 | Belke et al. | 33/143 L |
| 3,969,918 | 7/1976 | Bernotus et al. | 113/116 V |

FOREIGN PATENT DOCUMENTS 2353730 10/1973 Fed. Rep. of Germany ............... 72/16

Primary Examiner—Milton S. Mehr
Attorney, Agent, or Firm—Robert P. Auber; Ira S. Dorman; Aaron Passman

[57] ABSTRACT

A thickness gauge is shown for measurement with each stroke of a metal blanking and cupping press. The gauge is adapted to be carried with the press ram adjacent to the blanking die. The gauge includes a thickness feeler plunger and reference support for carrying contact pins. The feeler and the support for the pins are mounted for relative motion with respect to the moving part of the press and for limited relative motion with respect to each other whereby the gauge can accommodate press overstroke and varying thicknesses of stock.

12 Claims, 5 Drawing Figures

THICKNESS GAUGE

BACKGROUND OF THE INVENTION

The present invention relates to a thickness gauge for use in connection with measuring the skeleton remaining after a blanking operation. More particularly, the thickness gauge is carried with the press ram adjacent to the die for movement in order to measure the blanked skeleton during each stroke of the press. Prior art thickness measuring devices include techniques which measure the sheet stock material before blanking. Such devices are used to avoid problems associated with varying stock thickness. It is known that in metal sheet materials, the thickness across the surface tends to vary as a result of the casting and rolling operations necessary for manufacturing sheet. Thickness varies along lines parallel and perpendicular to the roll axis. Recognizing that the thickness varies laterally across a given section of the web of sheet material, it is important that the thickness gauge be compact and inexpensive enough to be used for monitoring the thickness at various points laterally across the web. Prior art thickness gauges are expensive and are rarely used to measure the web at more than one longitudinal span. It is also important to be able to measure the thickness of the sheet at a point which is close to the die set, such that, an accurate measure of the material thickness for any blank can be obtained.

Prior art thickness gauges have necessitated a separate apparatus for holding and supporting such gauges apart from the press, whereby the sheet being fed into the press was first passed through the thickness gauge before it entered the press. Such commonly used thickness gauges can rely, for example, on a pair of juxtaposed roller wheels which define and measure the sheet thickness by means of the spacing between their axes. Such a thickness measuring device is disadvantageous because the thickness of a particular sheet section is not easily relatable to a particular blank formed on the press and because the wear on the rollers tends to double the error in the reading.

It is, therefore, an object of the present invention to provide a thickness gauge which is carried with each press stroke in order to measure the thickness of the material being blanked so that each measurement can be associated with a particular blank formed by the press.

It is an object of the invention to provide a non-contact type transducer which can be remotely mounted for measuring the distance to a target also remotely mounted whereby the transducer is protected from the movement of sheet through the press and the transducer is insensitive to variations in the type of material being measured due to lack of homogeneity in a given material, to variations in surface plating, and to surface roughness.

It is still another object of the invention to provide a thickness gauge which will accommodate an overstroke of the device without deleterious consequences to the thickness measuring components.

It is a further object of the invention to provide a thickness gauge which permits relative motion between the reference detecting pins and the measuring or feeler plunger of the gauge whereby varying thicknesses of the sheet material will not harm or damage the thickness transducers which are sensitive to 0.00254 mm.

It is yet another object of the invention to provide a thickness gauge which is compact, inexpensive and reliable such that it can be mounted and carried with the press for movement with the die or punch during blanking.

For a device of such accuracy which is relatively low in cost, easy to adapt to any press any extremely flexible with regard to its application, the present thickness gauge uses the rigidity and the machine cycle of the cupping press to save the space and the cost of a separate machine. Each sinusoidal press ram motion lifts the feeler and the pins away from sheet stock during its advance through the machine. This motion prevents damage due to jamming, wearing due to sliding or rolling contact because the motion of the sheet stock occurs after the press stroke has retracted the gauge from its proximity to the stock. Similarly, there is immunity to burrs, welds and other surface imperfections often found on the sheet stock. Mounting of the gauge to the press ram eliminates the need to move the thickness gauge out of the way during press threading, press cleaning or press jam clearing operations.

A reference plane can be established by a portion of the press or by a special segment specifically added to the press at its working plane on the bolster plate, bed or platten across which the stock moves. While it is preferred it is not essential that the reference planes be perfectly aligned with the vertical axis of the gauge since the centerline of the feeler is always perpendicular to the reference plane and the three reference pins can in tripod fashion accommodate different heights relative to the press bolster plate, bed or platten without affecting the accuracy of the thickness measurements. To a certain extent there is compensation for changes due to wear or thermal expansion since both the feeler and the pins receive similar treatment during use.

The explanation of the details, features and advantages of the present invention will be better understood by reviewing the summary and the detailed description of the invention.

SUMMARY OF THE INVENTION

The thickness gauge of the present invention is attached to a cupping press and can include several thickness gauges mounted to move with the press ram of the cupping press thereby providing thickness measurements at several locations laterally across the web of the sheet. After metal sheet stock (tin plate, aluminum, etc.) passes through the blanking portion of the cupping press die during cup blank fabrication, a centered feeler carried upon a plunger in each of the thickness gauges is brought into contact with and intermittently flattens a portion of the sheet skeleton against the reference plane of the die support bolster plate. The flattening force can be set at any value above the minimum required to press the sheet stock skeleton into contact with the reference plane. Three pins, carried on a coaxial positioned outer support equidistantly positioned relative to each other and the feeler and are aligned to pass through the blanked cup holes of the skeleton and come to rest on the exposed reference plane thereby straddling the triangular shaped remnant of sheet stock. The diameter of the thickness gauge feeler establishes an area over which the thickness can be averaged. The center or feeler plunger is resiliently mounted to a gauge housing so that it can move upward in response to contact with the thickness of the skeleton remnant. Such movement positions a non-contact type impedance transducer connected to the inner feeler plunger away from a target associated with the outer coaxial support for the pins. The spring mounted for limited spring biased movement relative to the plunger and after the limited movement has occurred the loading of the plunger permits controlled relative motion between it and the thickness gauge housing by which both are supported. The spring loading of the plunger and the limited travel or the pin support permit a fixed relative displacement of the feeler transducer and the pin target equal to the plate thickness even though the press ram continue its downward motion through bottom dead center before retracting a predetermined distance of about 3 mm, thus releasing most of the flattening pressure on the skeleton sheet. Overstroking the gauge before measuring has been found to provide time for oscillation damping prior to the precise instant at which the thickness measurement is taken. A non-contact variable impedance transducer has been found to perform satisfactorily in measuring thicknesses, differences as slight as 0.00254 mm. Because the target is designed to work with the impedance transducer, the thickness gauge is insensitive to variations in surface roughness, variations in sheet coating or variations in the metallurgical structure of the sheet stock (the transducer is sensing the distance to the same unchanging target at a remote location from the sheet stock being measured). The output voltage of the transducer is proportional to the distance between the face of the variable impedance transducer and the conducting metal target. An analog-to-digital converter can be used to interface the impedance sensor signals and measurements can be stored for every stroke of the press. Periodically, or on demand, such measurements can be processed further by computer e.g. maximum and minimum values, number of readings outside of specified tolerances, number of readings within predetermined thickness ranges, statistical analyses of transverse and longitudinal topographical mappings. The sensing transducer, being of a non-contact proximity type, is rugged and reliable and will give excellent service life exceeding other types of transducers which press directly against the sheet stock.

In a preferred embodiment a Multi-Vit Model KD-2310-1u by Kaman Measuring Systems is used; it consists of a transducer which is cable connected to an oscillator—demodulator unit. The transducer is interchangeable with others of the same type if a calibration adjustment is made with a micrometer fixture or a spacer (having no impedance) of a standard dimension. The transducer consists of a variable impedance bridge with an active and reference coil. Variation in impedance (eddy currents induced by a conductive surface) resulting from relative displacement between a target and the transducer are measurable and can be related to units of thickness.

Normally, such transducers are applied to the surface to be measured, but in the present invention remote mountings for the target and transducer provide the mentioned advantages. The transducer is carried on a threaded member having a relatively fine ¼-40 thread whereby each turn of the member moves the transducer about 0.63 mm. to or from the target depending upon the direction of rotation.

The stability of the system is a function of the distance between the transducer and the target. That is to say that, the greater the distance the less the stability. In the present invention the minimum displacement between transducer and target is predetermined by the limited travel before intercooperative engagement between the mountings for the feeler and for the pins. More particularly, relative movement between the mountings is spring controlled and only permitted to a preset degree whereby the transducer follows the target such that the target never contacts the transducer. The impedance transducer is protected by its remote location and a set spacing between it and the target. In the case of a jam caused by multiple thicknesses of metal skeleton beneath the feeler and/or the pins both will compress their springs. The upward movement of the feeler plunger and the support for the pins caused by jamming carries the transducer and target at the preset finite distance such that the face of the transducer will not be damaged as a minimum gap is always maintained.

The thickness gauge housing is a metal box mounted to a bar fastened to the press ram. The box protects the transducer components from shock and contamination even though the gauge operates with the press at the speed of the press about 125 strokes per minute over a distance of approximately 5 cm.

DETAILED DESCRIPTION OF THE DRAWINGS

Figure 1:
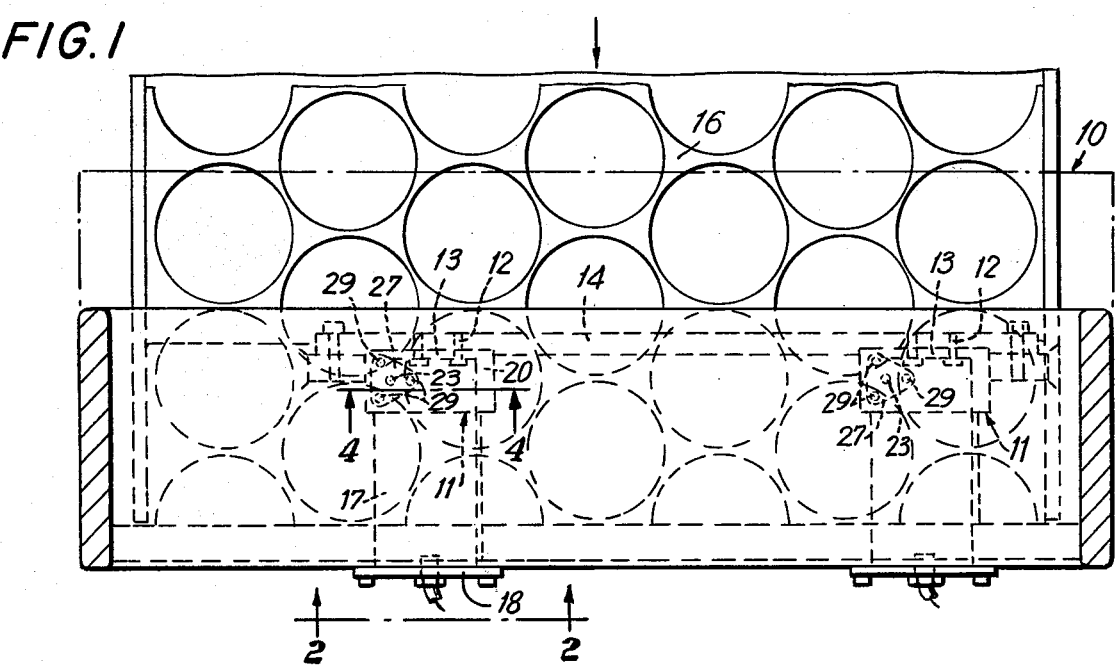
FIG. 1 is a top plan view of a portion of a metal cutting and forming press showing the relation of the invention to the press.
Figure 2:
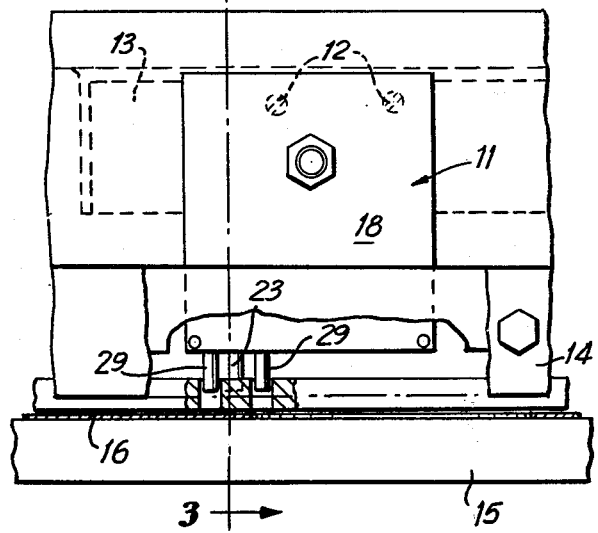
FIG. 2 is an enlarged front elevational view taken along lines 2—2 of FIG. 1 with portions broken away for the purpose of clarity.

Shown in FIG. 1 is a press 10 which includes the thickness gauge 11 attached to the press ram by cap screws 12. Each cap screw runs through a side 13 of thickness gauge 11 and into a support bar plate 14 attached to the ram of the press to be carried thereby as same is stroked in and out of the opened center section of the press during blanking and forming operations. The press 10 is used to first blank, then cup and then form or draw the cup in a progressive operation for forming cylindrical containers at speeds of 125 strokes per minute. With each stroke of the press the thickness gauge 11 is carried toward the bed of the press 15 where the sheet stock 16 is supported during blanking as shown in FIG. 1. The blanked, formed stock skeleton 16 is moved through the press after blanking and is positioned beneath the thickness gauge 11 in a manner which will be explained in detail whereby the thickness of the skeleton 16 can be measured relative to the bed 15 of the press 10. More particularly, as shown in FIG. 4, the thickness gauge 11 cooperates with the skeleton 16 and the bed 15 of the press 10 to measure the thickness of the stock skeleton 16.

A full understanding of the operation requires the understanding of the components of the thickness gauge 11. The gauge, as shown in FIG. 1 can be applied in multiples to the press 10 whereby any number of gauges 11 can be attached to the support plate 14 such that the skeleton 16 can be measured at various positions across the web of the sheet stock skeleton 16 by thickness gauges 11. As many as three thickness gauges have been applied to a press but for clarity of explanation and illustration only two are shown in the drawing of FIG. 1.

Figure 3:
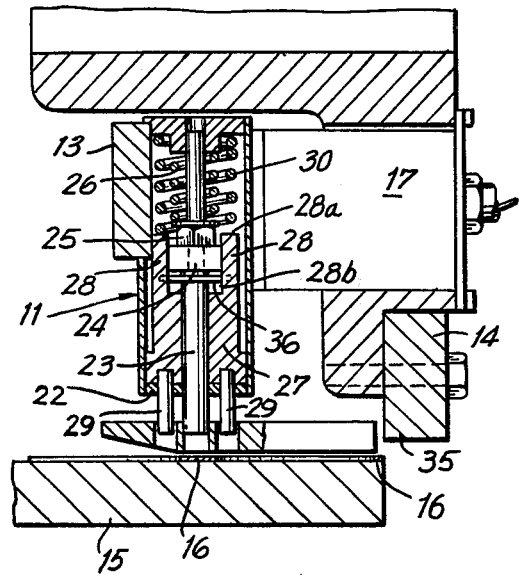
FIG. 3 is an elevational cross-sectional view as taken along line 3—3 of FIG. 2 showing the relationship between the moving parts of the thickness gauge and the press.
Figure 4:
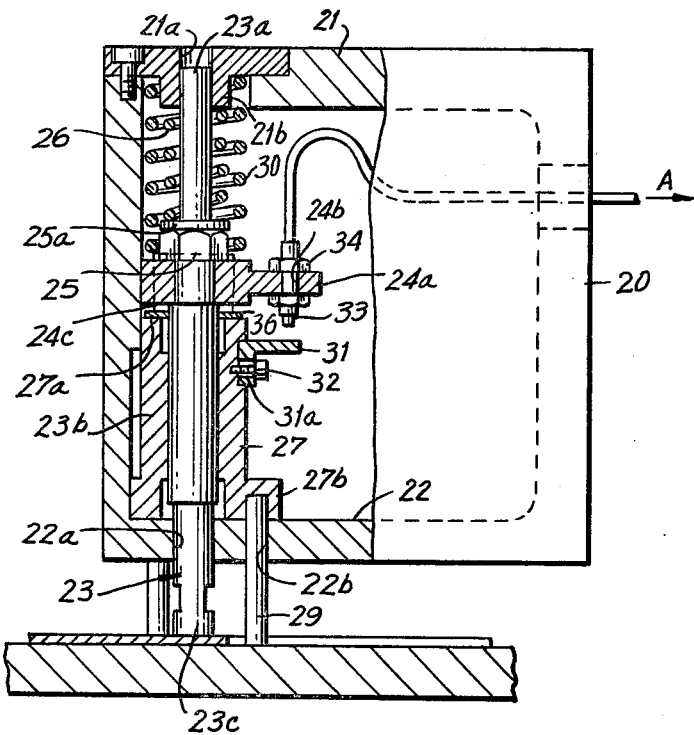
FIG. 4 is a side partial cross-sectional view taken along line 4—4 of FIG. 1 and showing the relationship of the gauge and the sheet to be measured.

Turning now to FIG. 3 and FIG. 4, a more detailed explanation of the construction of the thickness gauge 11 will be given. The gauge 11 has a box-shaped hollow enclosure 17 which consists of the aforementioned side 13 mounted to the ram of press 10 and an opposite side 18 positioned parallel to and spaced apart from side 13. Two ends 19 and 20 (19 being removed in FIG. 3 for purposes of showing the inside components of the thickness gauge 11) hold sides 13 and 18 apart and parallel to one another. A top 21 and bottom 22 as best shown in FIG. 4 are parallel to one another whereby the sides 13 and 18, the ends 19 and 20 and the top and bottom 21 and 22 form a box-like enclosure for protecting and supporting the essential components of the thickness gauge 11.

Supported within the enclosure 17 for longitudinal movement relative to the enclosure is an elongated cylindrical plunger 23 having a top 23a, a middle 23b and a bottom 23c. Plunger 23 is carried near the inside of end 19 within enclosure 17. Extending through the top 21 is plunger top 23a, there is a bushed opening 21a provided for that purpose. Bushed opening 21a is a separate part and is attached to top 21 in a known manner. The advantage of making bushed opening 21a of a separate part is that it can be more intricately shaped and it can be be arranged of a bearing material so the top 23a of plunger 23 is supported for movement only in an axial direction. Similarly, the bottom 23c is positioned to slide in an opening 22a in bottom 22 such that the other end of plunger 23 is supported for axial movement longitudinally with respect to enclosure 17 parallel to and near end 19. At the middle of plunger 23 is a shoulder 23d formed by necking down the middle to top portion of the plunger 23. Shoulder 23d is the top portion of a section 23e which is of a constant larger diameter and which extends to the bottom portion 23c. As will be explained, section 23e is of an outer diameter which is compatible with another member which rides thereupon in coaxial sliding fashion.

Resting upon shoulder 23d is an arm 24. Arm 24 includes an enlarged body portion having an opening for receiving top 23a of plunger 23 and an extending tab 24a directed away from end 19 toward end 20. Arm 24 is free to rotate relative to plunger 23 but such rotation is controlled as will be explained. In order to retain arm 24 against shoulder 24d there is a nut 25 which threadably engages with the shank portion of top 23a just above the point at which arm 24 rests upon shoulder 23d whereby the arm can be clamped against shoulder 23d for secure mounting thereto to prevent relative motion therebetween and to hold tab 24a normal to the axis of plunger 23. Carried atop the nut 25 is a flat washer 25a and between the upward surface of washer 25a and the inside of bushing 21a in close relation to the shank of top 23a is captured a helical compression spring 26 which operates to bias the top portion of arm 24 downwardly relative to the inside of top 21 thereby pushing plunger 23 normally downward such that bottom 23c is urged by spring force exteriorly of the enclosure 17.

As mentioned, plunger 23 has a section 23e which is of an enlarged diameter and carried for sliding engagement upon that enlarged diameter is a cylindrical hollow support member 27. Support member 27 has an inside diameter slightly greater than the diameter of section 23e, and has a top portion 27a having a pair of upwardly extending arms 28 (see FIG. 3), each of which has a top pad 28a with inwardly facing sides 28b; the latter arranged to move in sliding arrangement relative to the sides 24b of arm 24 for restraining the rotary motion of arm 24. At the bottom of member 27 is a flanged area 27b which includes three axial downward facing openings having cylindrical cross-sections for receiving gauging pins 29. There are three pins 29 (as shown in FIG. 1) pins 29 pass through openings 22b in bottom 22 and are positioned such that the blanked-out portion of the skeleton 16 will be in alignment with each of the pins 29. The bottom 23c of plunger 23 will align with the scant remains of the stock skeleton 16. In order to bias pins 29 downwardly and outwardly of enclosure 17, a compression coil spring 30 is carried coaxially about spring 26 and rides between pads 28a and bushing 21a such that pins 29 are normally biased downwardly and outwardly of enclosure 17. As mentioned bushing 21a is inset into top 21 and included thereon is a downward inside annular rib 21b which concentrically positions the top end of spring 30 in paralled spaced relation to spring 26. The lower end of spring 30 rests atop pads 28a of arms 28 (see FIG. 3). The inner diameter of spring 30 is slightly larger than the outer-most diameter of nut 25 whereby neither interfers with the other.

Attached to the side of support 27 opposite the inside of end 19 and extending normal to the axis support 27 toward end 20 is a bracket 31 disposed in spaced parallel relation to the tab 24a of arm 24. Bracket 31 is affixed to support 27 by means of a screw which passes through a slot 31a on the portion of bracket 31 which rests against the side of support member 27 which faces the inside of end 20. Screw 32 passes through an adjusting slot 31a provided in that portion of the bracket 31 whereby the position of bracket 31 relative to the member 27 may be adjusted. Bracket 31 is preferably manufactured of a known material such as particular aluminum alloy.

The bracket 31 is used as a target for an impedance sensitive transducer. More particularly, tab 24a of arm 24 has an opening therethrough located in the direction which is parallel to the axis of plunger 23 for supporting an impedance sensitive transducer 33 in alignment with the extended end of bracket 31 whereby the distance between bracket 31 and transducer 33 can be a function of the relative relationship between support 27 and plunger 23. Transducer 33 has a threaded exterior which cooperates with a pair of clamping nuts 34 provided for adjustably mounting the transducer 33 relative to the opening in tab 24a of arm 24. Similarly, the opening 24b in tab 24a can be threaded to receive the transducer and the nuts 34 are merely used for purposes of locking.

In operation the gauge 11 moves with the press as shown in FIG. 3 such that the stock skeleton 16 passes thereunder immediately after it is blanked out but before it is severed by a knife arrangement 35 which chops the scrap stock skeleton into small bits easy for handling. As the press 10 is stroking the gauge 11 is brought into contact with the stock skeleton 16 at 23c the bottom of the plunger end and through the openings within the skeleton 16 by pins 29 (see FIGS. 1, 3 and 4). The plunger 23 thus compresses its spring 26 and moves the arm carried impedance transducer 33 a set distance upwardly within enclosure 17 response to the thickness of the stock skeleton 16. Similarly, member 27 is moved upwardly against the tension of spring 30 in response to the contact between pins 29 and bed 15. The relative distance between the transducer 33 and the target 31 are, of course, a function of the thickness of the skeleton 16 (see FIG. 4). The transducer 33 and the target 31 are completely remote from the work plane of the press and are thereby protected from contamination and wear. It has been found that it is best to take the measurement after the press has slightly overstroked in order for the system to reach an equilibrium point.

Figure 5:
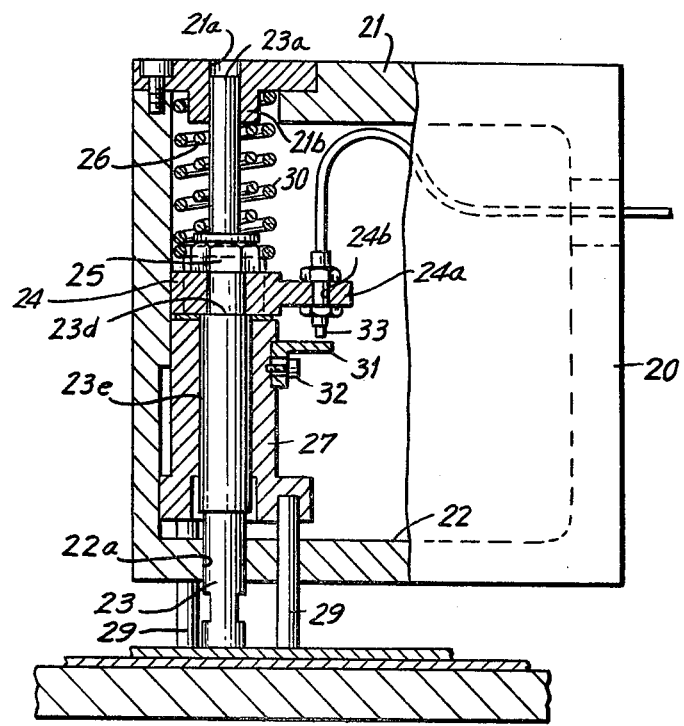
FIG. 5 is a view similar to FIG. 4, however, the sheet is doubled in FIG. 5 thereby lifting both the feeler and pins.

Turning now to FIG. 5 where irregular or jamming conditions are shown, that is to say that in such circumstances the skeleton 16 has doubled up because of jamming or folding or some other difficulty in moving the stock of skeleton 16 through the press 10. Under such a circumstance the clearance, between the upper face 27c of support member 27 and the lower face 24c of arm 24, is gone and contact has been made whereby both are moved as a unit. The spacing between faces 24c and 27c can be adjusted by means of a shim washer 36 disposed therebetween. Washer 36 is selected so that the end of transducer 33 never fully contacts the target bracket 31 (see FIG. 5).

The timing of the press can be related to the point at which the gauge has been overstroked sufficiently for the thickness reading at which point the signal from transducer 33 is transmitted as shown at arrow A in FIGS. 4 and 5 to a readout device (not shown).

From the foregoing those skilled in the art of press design will appreciate that a wide variety of press configurations could be used with the thickness gauge disclosed or that the gauge could be positioned at numerous sites on the press and still function properly in measuring stock with each stroke.

The invention and its many advantages will be understood from the preceeding description, and changes in form, construction, selection and arrangement of materials and components or changes in the steps of the method and process described can be made without departing from the broader aspects of it as set forth in the claims that follow.

What is claimed is:

1. A housed instrument to be carried on a press ram for movement therewith to and from the working plane of the press for measuring the stock skeleton thickness in the press comprising:
   (a) a housing affixed to the press ram and having a hollow inside to enclose said instrument;
   (b) a first means resiliently mounted within said housing for movement relative to the direction of travel of the press ram and being housed in alignment with and normal to the working plane of the press for engaging the stock skeleton lying thereon and flattening the stock skeleton against press bed to remove residual strain;
   (c) a second means resiliently associated with said housing and carried from the direction of press ram movement in sliding engagement with said first means for alignment with the normal to the working plane of the press for engagement therewith whereby stock skeleton thickness thereby displaces said first means relative to said second means in response to said cut material lying over the press working plane and lying under said first means;
   (d) an inter-engaging means being facing portions of said first and second means adapted to move said first means with said second means as a unit relative to said housing when said second means is moved opposite the direction of ram travel beyond a predetermined distance; and
   (e) measuring means carried within said housing and responsive to changes in said displacement between said first and second means for establishing a signal indicative of said relative displacement being the stock skeleton thickness.

2. The instrument of claim 1 wherein said measuring means includes a proximity transducer sensitive to displacement carried within said housing upon said first means for movement therewith in alignment with the direction of travel of said first means and a target means mounted upon said second means within said housing in position to align with said transducer and the former to be carried in a predetermined spaced apart relation responsive to said displacement while in a regular operating mode and responsive to said inter-engaging means when in an irregular operating condition having travelled beyond said predetermined distance.

3. The instrument of claim 1 or 2 wherein said first means includes a plunger having an elongated shank with one end positioned exteriorily of said housing and the other end passing therethrough such that said shank is supported for longitudinal movement relative to said housing and said plunger being biased to be normally positioned with said one end extended to its maximum extent out of said housing toward the press working plane.

4. The instrument of claim 3 wherein said plunger is generally cylindrical and carries a fixed arm extending normal to its middle portion, said arm adapted to support an end of a coaxially disposed first compression spring near said plunger and said arm adapted to support said measuring means away from said plunger whereby said first spring is captured between a wall of said housing and said arm for urging said plunger end outwardly of said housing for pressing the stock against the working plane with each stroke of the press ram.

5. The instrument of claim 4 wherein said second means includes a generally hollow and cylindrical support resiliently carried for sliding movement relative to said plunger and carried coaxially about the portion of said plunger between said arm and said housing which is opposite the portion of said plunger that carries said first spring and said second means includes pin means extending therefrom outwardly of said housing parallel to and in the direction of said extended plunger end said pin means cooperating with said housing to limit movement of said pin means to longitudinal relative to said housing.

6. The instrument of claim 5 wherein said second means includes upstanding pads which extend alongside and past said arm each having inwardly facing surfaces for permitting longitudinal movement of said arm while restraining rotary arm movement relative to the axis of said plunger, and each said pad having another surface normal to its inner surface and disposed to engage an end of a second compression spring the opposite end of which bears against said housing whereby said second spring is concentrically disposed relative to said first spring and acts to independently bias said pin means outwardly of said housing toward the working plane of the press.

7. The instrument of claim 6 wherein said inter-engaging means includes a spacer carried about said plunger between said facing portions of said first and second means said spacer having opposite parallel surfaces adapted for shimming said portions whereby said predetermined distance is precisely set.

8. The instrument of claim 2 wherein said transducer is an impedance sensitive detector and said target means is a conductive substance having uniform conductivity across an area aligned with said transducer.

9. The instrument of claim 6 wherein said housing moves substantially vertically with said ram and includes an enclosed cavity for said first and second means and said housing having opposite said wall a bottom with openings for said plunger and said pin means said wall and bottom being held together by a pair of parallel spaced apart sides and a pair of parallel spaced apart ends.

10. The instrument of claim 9 wherein said pin means includes three pins carried parallel and equal distance to one another and of equal distance from said plunger axis and each of said pins passing through an opening therefore in said bottom whereby said second means is restrained from rotation about its axis.

11. A method for measuring sheet stock feed through a metal blanking press with each stroke of the press including the following steps:
   (a) carrying a sheet stock contacting means with the press ram in its direction of travel for pressing and flattening the stock against the working plane of the press,
   (b) biasing said contacting means relative to said press ram for controlled movement thereof relative to said press ram and subject to the flattening force of said stock,
   (c) supporting a working plane locating means for setting a reference datum relative to said press ram by urging said locating means therefrom,
   (d) measuring a differential between preset portions of said means that are remote from the working plane when said means are respectively against the stock and the working plane whereby the stock thickness per stroke is indicated and the measuring means is protected from damage by stock movement in the press.

12. A gauge for measuring the thickness of a metal stock skeleton remaining on the press bolster adjacent the die after blanking the sheet stock the measurement being made with each stroke of the press ram comprising:
   (a) a press frame having an open center section through which sheet stock can be fed for blanking and measuring;
   (b) a ram for movement in and out of said section with each stroke of the press;
   (c) a housing carried by said ram and having a top and bottom held apart by a pair of sides and a pair of ends thereby forming a hollow enclosure for said gauge;
   (d) a feeler carried by said housing and mounted for movement in the direction of ram travel relative to said housing, said feeler being cylindrical and biased to extend outwardly of said housing toward said skeleton and in alignment therewith for approaching said skeleton as said ram approaches said stock;
   (e) pins carried coaxially on a hollow cylindrical member about said feeler and within said housing and being biased independently of said feeler for movement relative thereto such that said pins extend exteriorily of said housing in alignment with the openings in said skeleton;
   (f) an impedance transducer carried by said feeler within said housing and arranged in spaced apart relation to a target carried by said hollow cylindrical member for signaling the distance therebetween; and
   (g) a shoulder on said feeler positioned to face a distal surface of said hollow cylindrical member said shoulder and said surface having a preset spaced apart relationship being slightly greater than the maximum stock thickness but being less than the initial displacement between said transducer and said target for preventing contact therebetween.

* * * * *